United States Patent [19]

Heinz et al.

[11] Patent Number: 5,176,529
[45] Date of Patent: Jan. 5, 1993

[54] APPARATUS FOR CONNECTING CONTROL CURRENT LINES

[75] Inventors: Joachim Heinz, Köln; Johannes Winkler, Bornheim, both of Fed. Rep. of Germany

[73] Assignee: Klöckner-Moeller GmbH, Bonn, Fed. Rep. of Germany

[21] Appl. No.: 778,218
[22] PCT Filed: Apr. 17, 1991
[86] PCT No.: PCT/EP91/00732
§ 371 Date: Dec. 13, 1991
§ 102(e) Date: Dec. 13, 1991
[87] PCT Pub. No.: WO91/16742
PCT Pub. Date: Oct. 31, 1991

[30] Foreign Application Priority Data

Apr. 26, 1990 [DE] Fed. Rep. of Germany ....... 4013310

[51] Int. Cl.⁵ ............................................. H01R 13/00
[52] U.S. Cl. ................................................. 439/181
[58] Field of Search ............................ 439/181–187

[56] References Cited

U.S. PATENT DOCUMENTS 2,002,177  5/1935  Hastings .......................... 439/187
2,386,332 10/1945  Miller ............................... 439/181
2,689,898  9/1954  West ................................ 200/168
3,588,399  6/1971  Vlosca ............................. 200/519

FOREIGN PATENT DOCUMENTS 0363564  4/1990  European Pat. Off. .
2515152 10/1976  Fed. Rep. of Germany .
3114837  2/1982  Fed. Rep. of Germany .
3705728  9/1988  Fed. Rep. of Germany .

Primary Examiner—Joseph H. McGlynn
Attorney, Agent, or Firm—Nils H. Ljungman and Associates

[57] ABSTRACT

A device is disclosed for connecting control current lines in low voltage switchboard plants. The device should allow the control current in a plug-in distribution board to be easily maintained up to a test position of the rack and to be cut beyond this position when the rack is drawn out. The device has two multipoint plugs with plugs and sockets, of which the first is rigidly linked to the rack and the other is movably mounted over a limited path on two guiding pins, the terminal cross-section of which is enlarged. In the test position they are locked in by elastic elements, ensuring complete contact between both multipoint plugs in this position when the rack is inserted. A plurality of control lines can be easily cabled with little attrition in a reduced space within a plug-in distribution board and a test position can be reached by drawing out the rack.

5 Claims, 3 Drawing Sheets

APPARATUS FOR CONNECTING CONTROL CURRENT LINES

BACKGROUND OF THE INVENTION

1. Field of the Invention

This invention relates to an apparatus for the connection of control current lines, in particular for withdrawable units in low voltage switchgear.

2. Background Information

Low voltage switchgear, such as motor control centers or power distribution installations, have employed withdrawable unit design for many years, in cases where it is necessary to be able to quickly replace components assembled into a functional unit, to achieve short down times for the electrical operating equipment when maintenance work is required, or to achieve brief operational interruptions caused by defective functional components.

For testing or maintenance purposes, it is currently customary to insert or remove the withdrawable unit into or from a test position, whereby only the load current is interrupted, and the control current to the individual functional components is continued in this position.

The continuation of the control current is achieved by contacting the connecting elements which carry the control current even in the test position.

If the withdrawable unit is pulled out farther, the control current feed is also interrupted. This position is customarily called the disconnected position.

The position in which both the load current and the control current are fed is called the "On" position.

An apparatus of the type described above is disclosed in OS 2515152. In that case, the connecting elements are designed as sliding contacts, which slide over one another from the "On" position to the test position.

In such a case, the connecting elements can suffer wear and damaging abrasion on account of the sliding metal connecting elements.

An additional contact apparatus which is also suitable for the control current connection, is realized by means of a form-fit. Such an apparatus is disclosed in OS 3114837.

The connection designated an overtravel contact consists of a contact finger which is equipped with expanded portions for a positive connection with a contact pin, whereby the connection is released by means of a tripping sleeve.

This type of connection has the disadvantage that it is complex and expensive, and takes up a relatively large amount of space. It is therefore not well suited for a large number of control lines.

OBJECT OF THE INVENTION

The object of the invention is to create an apparatus for the connection of control current lines, in particular for withdrawable units in low voltage switchgear, employing simple means which eliminate the disadvantages indicated above.

SUMMARY OF THE INVENTION

This object is achieved by the invention described in the characteristic portion of claim 1. The movable contact strip can accompany the travel of the withdrawable unit between the test position and the "On" position, so that the control lines remain connected for this distance.

The refinement of the invention characterized in claim 2 is advantageous for the accomplishment of the object indicated above. In this refinement, the contact occurs automatically during insertion, before reaching the test position, while during extraction of the withdrawable unit, the disconnection from the test position also occurs automatically.

That can be accomplished in particular by the use of spring elements, which are characterized in claims 3 and 4, to prevent the movement of the movable contact strips by means of a catch. It is particularly advantageous if the catch during insertion is hard enough that the contact strips engage one another, while during the extraction of the withdrawable unit, they are not yet disconnected, but this separation to the disconnected position of the withdrawable unit is caused by the limit of the guide pins.

BRIEF DESCRIPTION OF THE DRAWINGS

The accompanying drawings contain a schematic illustration of one preferred embodiment of the invention.

DESCRIPTION OF THE PREFERRED EMBODIMENTS

Figure 1:
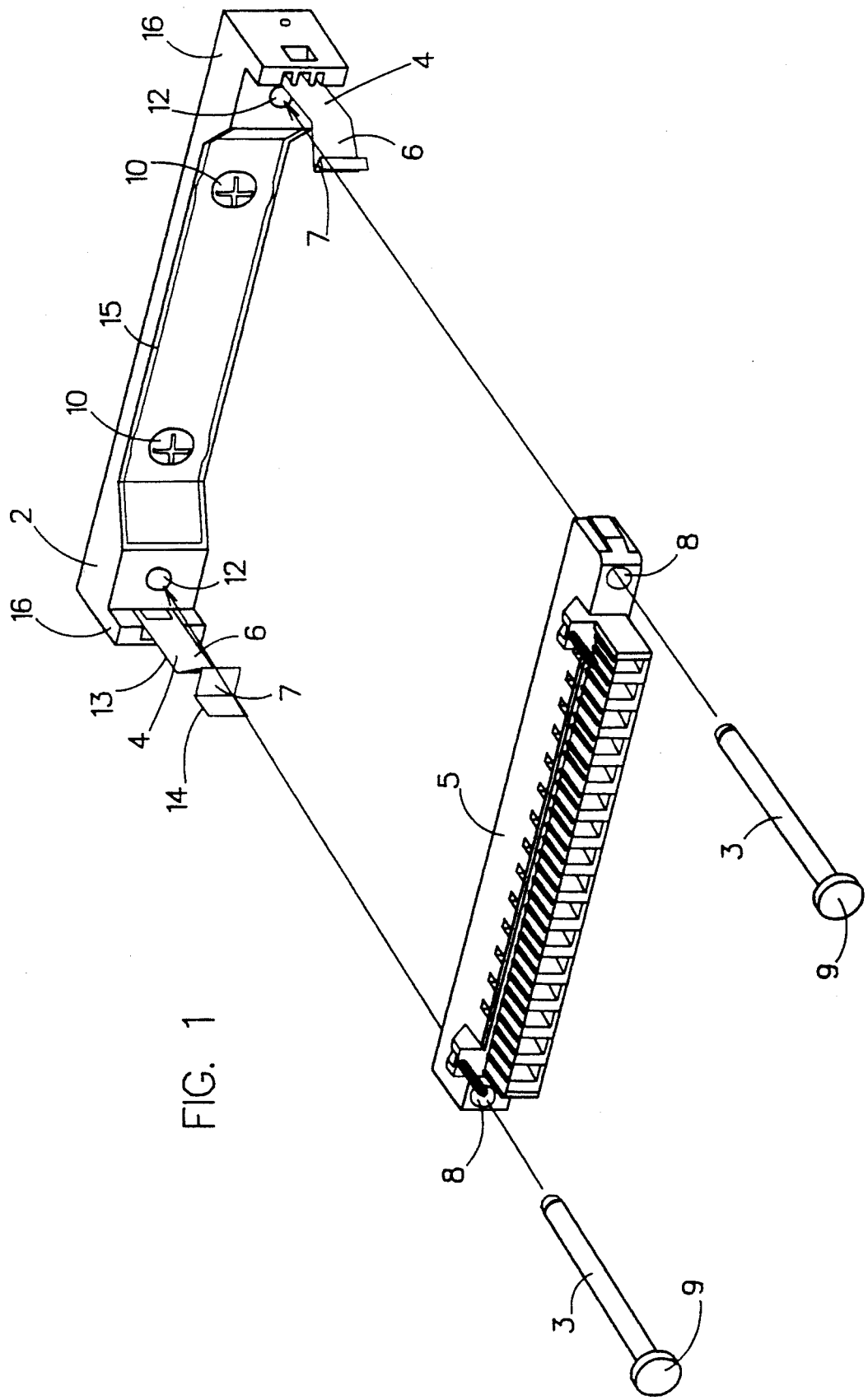
FIG. 1 shows an disassembled view of the invention, in perspective.
Figure 2:
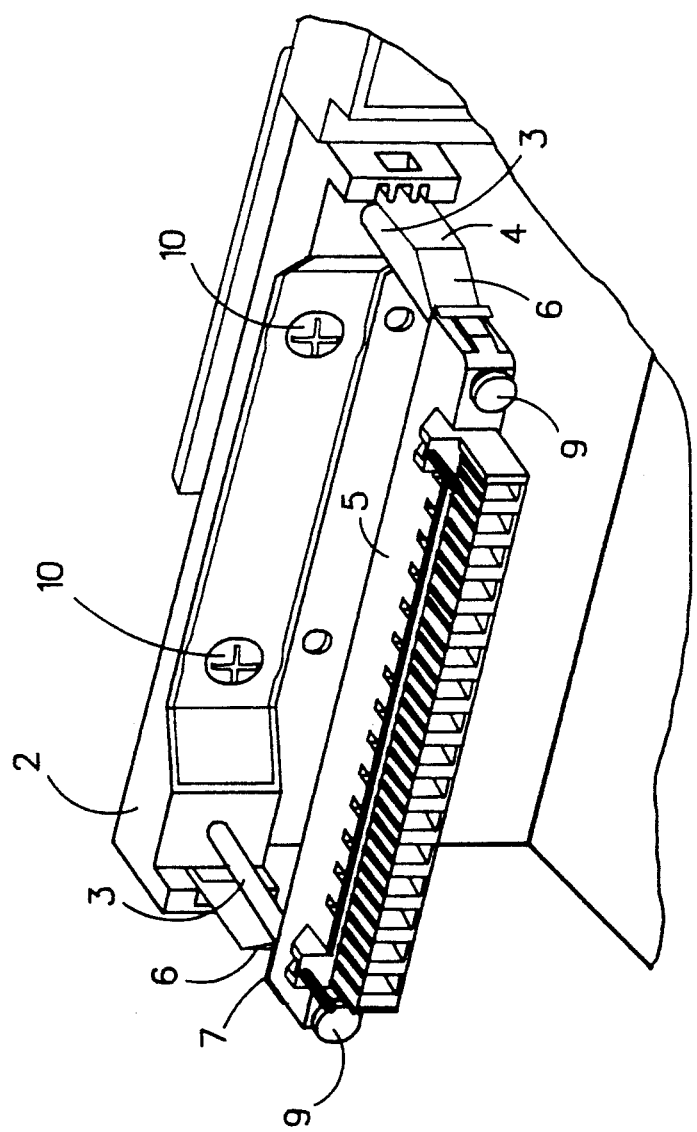
FIG. 2 shows an assembled view of the invention, in perspective.

The apparatus 1, as shown in particular in FIG. 1 and FIG. 2, consists of a mounting element 2, two guide pins 3, two spring tabs 4 and a contact strip 5 of the type disclosed by the prior art. The mounting element 2 has an oblong shape, and is fastened horizontally by means of two screws 10 in the vicinity of the back side of the distribution board or distribution panel.

In each of its terminal sections, it has a spring tab 4 projecting toward the front.

Immediately next to the spring tabs, on the inside, are two threaded holes to hold the two guide pins 3.

When the apparatus 1 is assembled, the contact strip 5 (here designed as a socket connector) is mounted so that it can be moved with the two guide pins 3 over a sliding seat in the connection direction (Arrow A). The guide pins 3 thereby project into and through the holes 8 in the side of the contact strip, and are engaged with their end opposite the head in the threaded holes 12 of the mounting element.

The head of the guide pin 3 has an expanded cross section 9, and forms a stop for the contact strip 5.

The spring tab, starting at approximately one-half its length, has a tab segment 6, which is tapered inward at an angle of approximately 45 degrees, approximately to the guide pin. Adjacent to this tab segment 6 is a tab segment 7, which is tapered outward, and has an angle of approximately 90 degrees, so that the latter runs practically parallel to the mounting element.

The mounting element 2 has an notch 15, in which there is space for the lines exiting from the reverse side of the contact strip.

Figure 3:
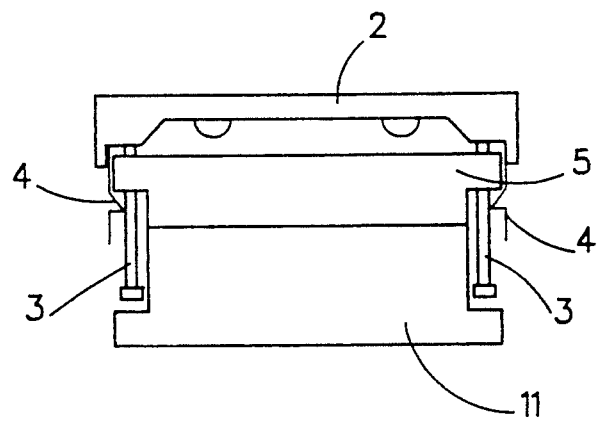
FIG. 3 shows an overhead plan view of the apparatus in the "On" position.

The contract strip 11 (here designed as a push-on terminal strip) for the control current connection is permanently connected to the withdrawable unit. In the "On" position, the withdrawable unit is completely inserted, whereby the socket connector is also inserted toward the rear and makes contact with the push-on terminal strip, as shown in FIG. 3.

In this position, both the load current and the control current are fed to the equipment.

To move it into a test position, the withdrawable unit is pulled out until the socket connector is a short distance ahead of the stop which is formed by the head of the guide pin. To reach this position, the socket connector is guided by the guide pins along the connector direction (Arrow A).

During this process, the side segments of the socket connector make contact with the tab segments 6 and push the spring tabs outward, whereby the resilience of the tabs is designed so that the contact between the socket connector and the push-on terminal strip remains intact.

Once the socket connector has passed the tab segment 6, the spring tabs fall back into the initial position. The withdrawable unit has now been placed in the test position: the load current was interrupted during extraction, so that now only the control current remains fed.

Figure 4:
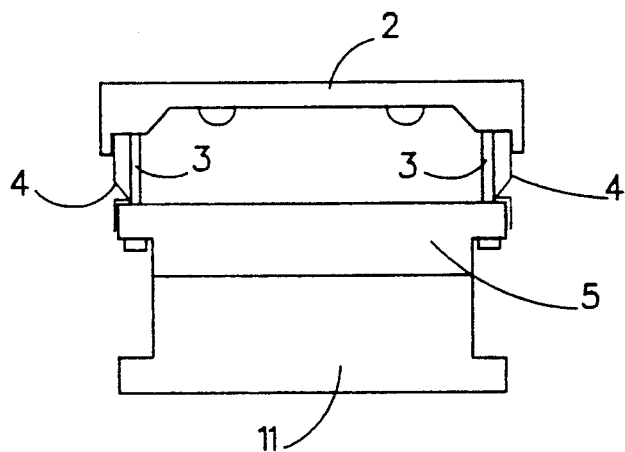
FIG. 4 shows an overhead plan view of the apparatus in the test position.

FIG. 4 illustrates the test position.

Figure 5:
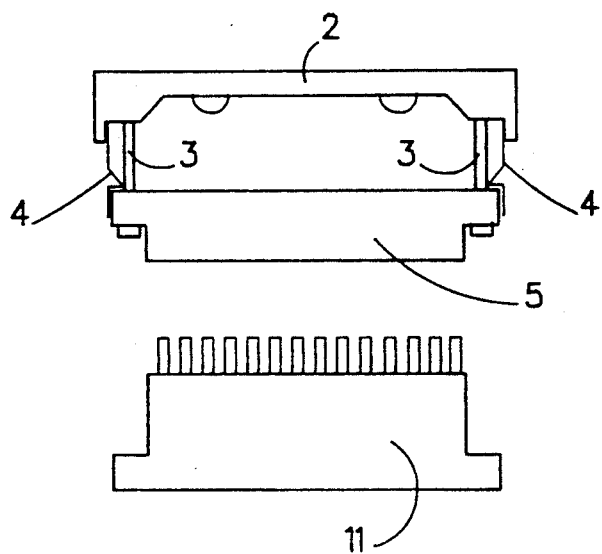
FIG. 5 shows an overhead plan view of the apparatus in the disconnected position.

If the withdrawable unit is pulled out beyond the test position, the socket connector encounters a stop on the head of the guide pin, so that contact is interrupted by further extraction, as a result of the disconnection of the push-on terminal strip from the socket connector. This position is illustrated in FIG. 5. and is conventionally called the disconnected position.

When the withdrawable unit is pushed back into the distribution panel housing, the push-on terminal strip is once again engaged in the socket connector, whereby the socket connector is held by the tab segments 7, on account of their greater slope, until complete contact is made. This position again corresponds to the test position.

Finally, if the withdrawable unit is inserted even farther, the tabs yield on account of the increasing force exerted on them, and flex outward away from one another, so that the withdrawable unit can be placed in the "On" position.

One aspect of the invention resides broadly in an apparatus for the connection of control current lines, in particular for withdrawable units in low voltage switchgear, consisting of connector elements and socket elements, which are in contact in a first position (test position) of the withdrawable unit, ad maintain this connection up to a second withdrawable unit position ("On" position), characterized by the fact that the connector and socket elements are located in two contact strips, one of which is fixed and stationary, while the other is designed so that it can move over a limited distance.

Another aspect of the invention resides broadly in an apparatus, characterized by the fact that the moving contact strip follows the path of movement of the withdrawable unit, so that during insertion, before reaching the "test" position, there is a catch, in which the movable contact strip is held, and causes contact between the connector and socket elements, that as the withdrawable unit is moved further into the "On" position, the connected contact strips are carried along with it, and that during the movement of the withdrawable unit toward the "disconnected" position, the movement of the movable contact strips is limited after passing the "test" position and before reaching the "disconnected" position, so that the two contact strips are separated by a safe distance even before reaching the "disconnected" position, whereby the movable contact strip remains held in the original position between the catch and the limit.

Yet another aspect of the invention resides broadly in an apparatus, characterized by the fact that the movable contact strip is located so that it can be moved on a mounting element, preferably on two guide pins, that the guide pins have an expanded cross section which limits the movement of the movable contact strip, and that on the mounting element there are spring elements, which cause a catching of the movable contact strip.

A further aspect of the invention resides broadly in an apparatus, characterized by the fact that on the mounting element, there are spring elements, which have an offset in the direction of the contact strip, which is shaped so that a first tapered surface, which lies in the direction of the mounting element, has a slight slope, while a second tapered surface has a steeper slope, and that the offsets are oriented so that together with the end surfaces of the contact strip, they act as a catch.

A yet further aspect of the invention resides broadly in an apparatus, characterized by the fact that the resilience of the spring elements, when the withdrawable unit is being pulled out to the test position, is designed so that the contact between the moving contact strip and the contact strip fastened to the rear wall of the withdrawable unit is not interrupted, on account of the low slope of the tapered surface, while when the withdrawable unit is pushed in from the disconnected position into the test position, on account of the slope of the second tapered surface, there is full contact between the contact strips.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modification and variations thereof may be made without departing from the spirit and scope of the invention.

What is claimed is:

1. Apparatus for the connection of control current lines, in particular for withdrawable units in low voltage switchgear, comprising connector elements and socket elements which elements are in contact in a first position (test position) of the withdrawable unit, and maintain this connection up to a second withdrawable unit position ("On" position), characterized by the fact that the connector and socket elements are located in two contact strips, one of the contact strips is fixed and stationary, while the other contact strip is designed so that said contact strip can move over a limited distance.

2. Apparatus according to claim 1, characterized by the fact that the moving contact strip follows the path of movement of the withdrawable unit, so that during insertion of the withdrawable unit, before reaching the "test" position, there is a catch, in which the movable contact strip is held, and causes contact between the connector and socket elements, that as the withdrawable unit is moved further into the "On" position, the connected contact strips are carried along with the withdrawable unit, and that during the movement of the withdrawable unit toward the "disconnected" position, the movement of the movable contact strips is limited after passing the "test" position and before reaching the "disconnected" position, so that the two contact strips are separated by a safe distance even before reaching the "disconnected" position, whereby the movable contact strip remains held in the original position between the catch and the limit.

3. Apparatus according to claim 2, characterized by the fact that the movable contact strip is located so that it can be moved on a mounting element, preferably on two guide pins, that the guide pins have an expanded cross section which limits the movement of the movable contact strip, and that on the mounting element there are spring elements, which cause a catching of the movable contact strip.

4. Apparatus according to claim 3, characterized by the fact that on the mounting element, there are spring elements, which spring elements have an offset in the direction of the contact strip, which offset is shaped so that a first tapered surface, which lies in the direction of the mounting element, has a slight slope, while a second tapered surface has a steeper slope, and that the offsets are oriented so that together with the end surfaces of the contact strip, the tapered surface and end surface act as a catch.

5. Apparatus according to claim 4, characterized by the fact that the resilience of the spring elements, when the withdrawable unit is being pulled out to the test position, is designed so that the contact between the moving contact strip and the contact strip fastened to the rear wall of the withdrawable unit is not interrupted, on account of the low slope of the tapered surface, while when the withdrawable unit is pushed in from the disconnected position into the test position, on account of the slope of the second tapered surface, there is full contact between the contact strips.

* * * * *